(12) United States Patent
Akamatsu et al.

(10) Patent No.: US 8,800,381 B2
(45) Date of Patent: Aug. 12, 2014

(54) TEST APPARATUS FOR A THREADED JOINT FOR OIL COUNTRY TUBULAR GOODS

(71) Applicants: Chiaki Akamatsu, Osaka (JP); Yasuhiro Yamamoto, Osaka (JP); Shigeo Nagasaku, Osaka (JP)

(72) Inventors: Chiaki Akamatsu, Osaka (JP); Yasuhiro Yamamoto, Osaka (JP); Shigeo Nagasaku, Osaka (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 128 days.

(21) Appl. No.: 13/628,319

(22) Filed: Sep. 27, 2012

(65) Prior Publication Data

US 2013/0019690 A1    Jan. 24, 2013

Related U.S. Application Data

(63) Continuation of application No. PCT/JP2011/060409, filed on Apr. 28, 2011.

(30) Foreign Application Priority Data

May 6, 2010 (JP) ................... 2010-106443

(51) Int. Cl.
*F16B 31/02* (2006.01)
*G01M 3/28* (2006.01)
*F16L 55/16* (2006.01)

(52) U.S. Cl.
CPC .............. *G01M 3/2853* (2013.01); *F16L 55/16* (2013.01); *G01M 3/2861* (2013.01); *F16B 31/02* (2013.01)
USPC .............................................. 73/761; 73/760

(58) Field of Classification Search
USPC ................................................... 73/760, 761
See application file for complete search history.

(56) References Cited

U.S. PATENT DOCUMENTS

| 4,464,994 | A  | * | 8/1984  | Porter ........................... 102/333 |
| 5,492,436 | A  |   | 2/1996  | Suksumake |
| 6,679,526 | B2 | * | 1/2004  | Yamamoto et al. ............ 285/55 |
| 6,869,111 | B2 | * | 3/2005  | Goto et al. ..................... 285/333 |
| 7,494,159 | B2 | * | 2/2009  | Sugino et al. .................. 285/334 |
| 7,770,935 | B2 | * | 8/2010  | Imai et al. ...................... 285/94 |
| 7,823,931 | B2 | * | 11/2010 | Hamamoto et al. .......... 285/334 |
| 7,900,975 | B2 | * | 3/2011  | Nakamura et al. ............ 285/334 |

FOREIGN PATENT DOCUMENTS

| JP | 58-27753    | 2/1983 |
| JP | 61-097546   | 5/1986 |
| JP | 2008-532029 | 8/2008 |

* cited by examiner

*Primary Examiner* — Max Noori
(74) *Attorney, Agent, or Firm* — Clark & Brody

(57) ABSTRACT

An apparatus 1 for evaluating the performance of a threaded joint for oil country tubular goods using a first steel pipe P1 and a second steel pipe P2 has a base 2 which holds a first steel pipe P1 in an upright position with an upper end of the first steel pipe P1 extending above the base and the remainder partly disposed under ground. A support member 3 mounted on the base 2 extends alongside the first steel pipe P1. A second steel pipe P2 is suspended above the first steel pipe P1 by a suspending mechanism 4. A threaded joint can be connected and disconnected by first and second tongs 5 and 6 which rotate the second steel pipe P2 with respect to the first steel pipe P1. A stabilizer 7 mounted on the support member 3 can limit the radius of gyration of the second steel pipe P2.

8 Claims, 3 Drawing Sheets

(a)

(b)

TEST APPARATUS FOR A THREADED JOINT FOR OIL COUNTRY TUBULAR GOODS

TECHNICAL FIELD

This invention relates to a test apparatus for threaded joints for oil country tubular goods, and specifically, it relates to a test apparatus for threaded joints for oil country tubular goods which can accurately evaluate the joint performance and especially the galling resistance of threaded joints for oil country tubular goods which are long steel tubes having a threaded portion on each end.

BACKGROUND ART

Oil country tubular goods, which are steel pipes used in the excavation of oil wells and gas wells and which includes tubing through which oil or gas flows and casing which surrounds tubing in a well and has a larger diameter than tubing, normally have an overall length exceeding 10 meters. In the field, a large number of oil country tubular goods are successively connected together by threaded joints to a length sufficient for the resulting string of oil country tubular goods to reach an underground oil or gas layer. The depth of an oil or gas well is often from several thousand to ten thousand or more meters, so the number of oil country tubular goods which are connected in series by a threaded joint becomes a large number.

A threaded joint for connecting oil country tubular goods to each other is constituted by a pin having male or external threads and a box having female or internal threads. In its environment of use, threaded joints for oil country tubular goods are subjected not only to compound stresses comprising axial tensile stresses caused by the weight of the connected oil country tubular goods and the threaded joints themselves and stresses caused by internal and external pressures, but also to thermal stresses produced by geothermal heat. A threaded joint for oil country tubular goods needs to maintain gas tightness (sealing properties) without being damaged even under such a severe environment.

When oil country tubular goods are lowered into a well, a threaded joint which has once been connected is sometimes loosened and disconnected and then reconnected. Therefore, API (American Petroleum Institute) standards require that a threaded joint for oil country tubular goods be capable of being connected and disconnected 10 times for a joint for tubing and 3 times for a joint for casing without undergoing unrepairable seizing referred to a galling while maintaining gas tightness.

In order to meet this demand, in the past, galling resistance of threaded joints for oil country tubular goods (also referred to as OCTG connections) has been evaluated by a simulation prescribed by ISO 13679 in which short steel pipes having an overall length of around 1-1.5 meters are used as test pieces. The test pieces are subjected to repeated connection (also referred to as make-up) and disconnection (also referred to as break-out).

However, when a threaded joint for actual oil country tubular goods, which may have a length exceeding 10 meters, is connected or disconnected, the upper portion of the upper pipe of the two oil country tubular goods being connected gyrates due to bending which is invariably present in oil country tubular goods. As a result, a moment (load) acts on the threaded joint, and the threads of the joint may sometimes be damaged at an early stage of use. However, in a simulation using short steel pipes as test pieces, it is not possible to reproduce this type of damage to the threads of a joint, so it is not always possible to accurately evaluate the galling resistance of a threaded joint for oil country tubular goods with a length exceeding 10 meters.

In the past, tests for evaluating the galling resistance of a threaded joint using actual oil country tubular goods have been carried out in the field of operation or using a test apparatus which is roughly the same as an actual oil rig. For example, Patent Document 1 discloses an apparatus capable of moving an oil rig structure on an offshore platform. It is described therein that the galling resistance of a threaded joint for oil country tubular goods is evaluated using a test apparatus in which the rear end (upper end) of a first oil country tubular good which is positioned above is directly grasped so as to align this first tubular good with a second oil country tubular good which is positioned below in a fixed state and then rotate the first oil country tubular good in order to screw the first tubular good into the second tubular good.

As shown in FIG. 1 of Patent Document 1, the test apparatus disclosed in that document is extremely large-scale and tall. If it is attempted to evaluate the galling resistance of a threaded joint of an actual oil country tubular good using such a test apparatus which can be applied to practical use, the time required for preparation for the test, the number of testing personnel, and costs become extremely large, so it is not possible to easily and inexpensively evaluate the galling resistance of an actual threaded joint for oil country tubular goods. Accordingly, there is a strong demand by users of oil country tubular goods for a test apparatus which can accurately, easily, and inexpensively evaluate the galling resistance of a threaded joint for an oil country tubular good actually used in the field.

Thus, it is not always possible to accurately evaluate the joint performance (particularly the galling resistance) of a threaded joint for an actual oil country tubular good by a conventional simulation using a short steel pipe, and if it is attempted to directly evaluate the properties of actual oil country tubular goods, there are the problems that the time required for preparation of the test, the number of test personnel, the costs, and the like are enormously increased since there are a very wide variety of specifications of oil country tubular goods which differ with respect to dimensions and target performance.

In recent years, in offshore oil rigs which have come to be much used as the depth of wells has increased, although it depends upon the type, oil country tubular goods are connected by threaded joints in an environment which is always oscillating. Up to now, there was no test apparatus which could evaluate the galling resistance of a threaded joint for oil country tubular goods in an oscillating condition. Accordingly, there is a strong demand for such a test apparatus by users of oil country tubular goods.

Patent Document 1—U.S. Pat. No. 5,492,436

SUMMARY OF THE INVENTION

An object of the present invention is to provide a test apparatus for a threaded joint for oil country tubular goods which can accurately, easily, and inexpensively evaluate the joint performance (such as the galling resistance) of a threaded joint for actual oil country tubular goods.

Another object of the present invention is to provide a test apparatus for a threaded joint for oil country tubular goods which can accurately, easily, and inexpensively evaluate the joint performance of a plurality of types of threaded joints for oil country tubular goods having different dimensions and target properties.

Yet another object of the present invention is to provide a test apparatus for a threaded joint for oil country tubular goods which can accurately evaluate the joint performance in an oscillating environment such as occurs on an offshore oil rig.

The present invention provides a test apparatus for evaluating the performance of a threaded joint for oil country tubular goods using a first and a second steel pipe which are used as oil country tubular goods in which each steel pipe has an end threaded portion to constitute a threaded joint. In one embodiment of the present invention, the test apparatus includes the following components:

a base which holds a first steel pipe in an upright position with an upper end of the first steel pipe projecting above an upper surface of the base and the remainder of the first steel pipe disposed through the base and partially under the ground;

a support member which extends upwards from the base and is spaced from the first steel pipe;

a suspending mechanism which suspends a second steel pipe above the first steel pipe;

a first tong which grasps the first steel pipe;

a second tong which grasps the second steel pipe and rotates the second steel pipe around its axis to carry out make-up and break-out of the first and second steel pipes by means of the threaded joint to be tested; and a stabilizer which is mounted on the support member such that its height can be raised or lowered and which restricts the permissible radius of gyration of the second steel pipe at the height of the stabilizer to a predetermined value.

The stabilizer preferably has a bore through which the first and second steel pipes can pass, and the bore constitutes a means for restricting the radius of gyration of the second steel pipe.

The stabilizer is preferably disposed above the lengthwise center of the second steel pipe which is suspended by the suspending mechanism.

The stabilizer preferably has a mechanism for adjusting the permissible radius of gyration of the second steel pipe.

The mechanism for adjusting the permissible radius of gyration of the second steel pipe is preferably constituted by a plurality of adjustable protrusions provided on the wall of the bore of the stabilizer and extending inwardly.

The support member preferably comprises a plurality of support pillars disposed such that the first steel pipe is located between them.

The suspending mechanism preferably comprises a crane having a wire and a hook block for suspending the second steel pipe.

The base preferably has a mechanism for producing vertical and/or horizontal oscillation of the base.

According to the present invention, the joint performance (such as the galling resistance) of a threaded joint for oil country tubular goods can be accurately, simply, and inexpensively evaluated using actual oil country tubular goods. Furthermore, a test apparatus according to the present invention can test the performance of joints for multiple types of oil country tubular goods having different dimensions or target performance. In addition, the test apparatus can be used for testing threaded joints for oil country tubular goods of both the coupling type and the integral type.

Furthermore, by providing the base with an oscillation mechanism, a test apparatus according to the present invention can accurately evaluate the performance of threaded joints for oil country tubular goods in an environment experiencing oscillation, so as to simulate the environment on an offshore oil rig.

EMBODIMENTS OF THE INVENTION

Below, embodiments of a test apparatus according to the present invention will be explained while referring to the accompanying drawings.

First Embodiment

Figure 1:
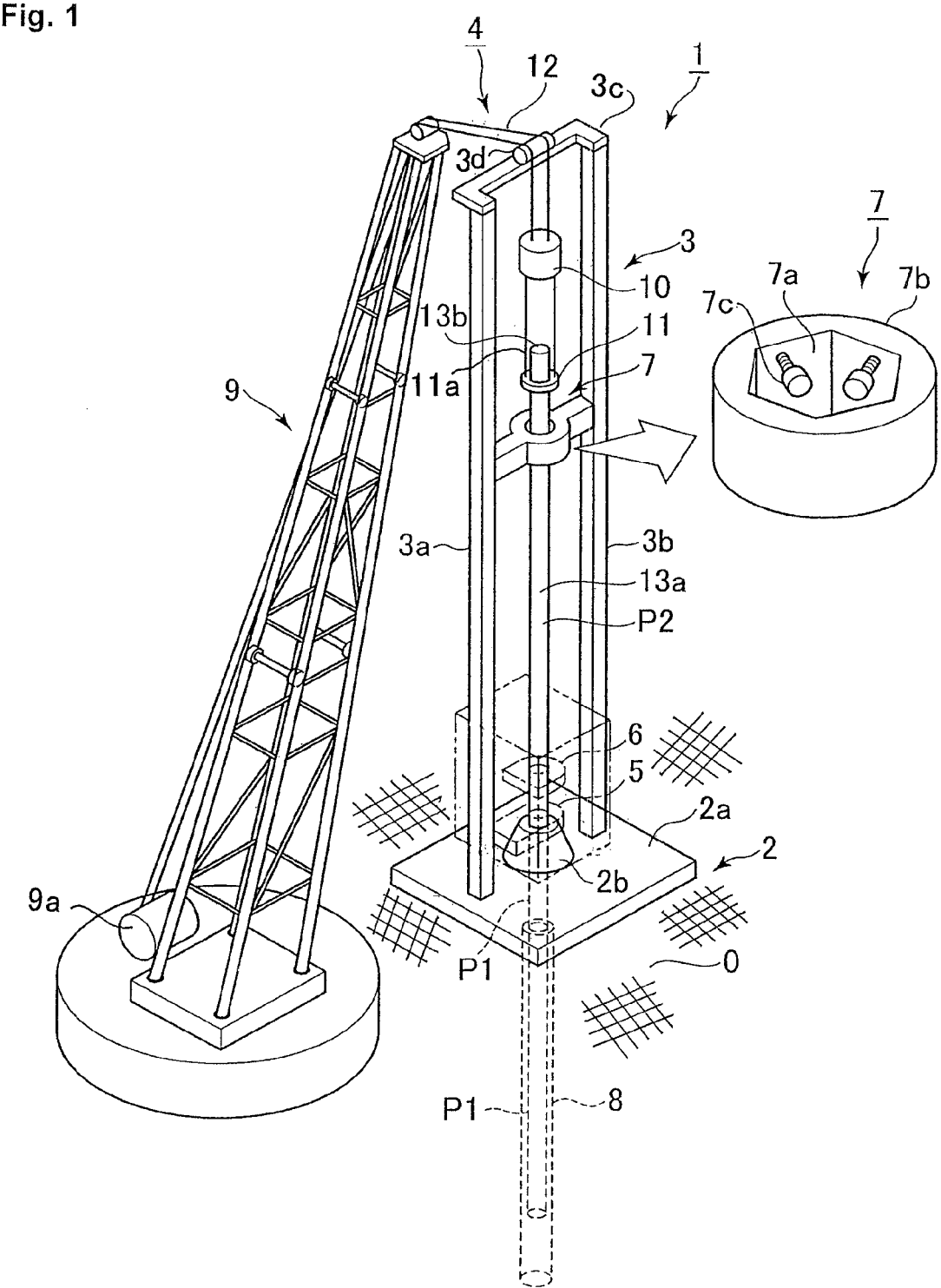
FIG. 1 is a simplified explanatory view schematically showing a test apparatus for a threaded joint for oil country tubular goods according to the present invention.

FIG. 1 is a simplified explanatory view showing a first embodiment of a test apparatus 1 according to the present invention. This test apparatus 1 is intended to evaluate the performance of a threaded joint for oil country tubular goods which is constituted by a first steel pipe P1 and a second steel pipe P2. The second steel pipe P2 is disposed above the first steel pipe P2 which is held in an upright position, and the upper end of the first steel pipe P1 and the lower end of the second steel pipe P2 are connected to each other using a threaded joint.

The threaded joint for oil country tubular goods which is tested may be either a coupling-type joint or an integral joint. With a coupling-type threaded joint, a pin having male threads is normally formed on the outer surface of both ends of the first steel pipe P1 and the second steel pipe P2, and a box having female threads is normally formed on the inner surface at both ends of a coupling (a short tubular member formed separately from the steel pipes). At the time of shipment, the coupling is normally previously mounted on one end of each steel pipe. In the present invention, when a threaded joint is of the coupling type, the term "steel pipe" means a steel pipe having a coupling previously mounted on one end thereof.

In the case of an integral threaded joint, a pin having male threads is formed on the outer surface of one end of each of the steel pipes P1 and P2, and a box having female threads is formed on the inner surface of the other end of each steel pipe. Two steel pipes are directly connected to each other without using a coupling by screwing the pin on one steel pipe into the box of the other steel pipe.

When testing a coupling-type threaded joint, the first steel pipe P1 and the second steel pipe P2 are preferably orientated so that the end of each steel pipe having a coupling mounted thereon faces upwards because this orientation makes it possible to grasp each steel pipe by elevators at the border between the coupling and the steel pipe. In this case, the first and second steel pipes P1 and P2 are connected to each other using the coupling mounted on the first steel pipe P1, and the pin formed on the lower end of the second steel pipe P2 is threaded into the box formed in the coupling mounted on the first steel pipe P1.

With an integral threaded joint, the first steel pipe P1 and the second steel pipe P2 are preferably oriented so that the end of each pipe on which the pin is formed faces downwards. In this case, the pin formed on the lower end of the second steel pipe P2 is inserted into the box formed at the upper end of the first steel pipe P1 disposed beneath it, and the pin is screwed into the box to make up the joint.

One or both of the first steel pipe P1 and the second steel pipe P2 may be of the double joint type in which two steel pipes are connected to each other.

As shown in FIG. 1, a test apparatus 1 according to the present invention includes a base 2, a support member 3, a suspending mechanism 4, a first tong 5, a second tong 6, and a stabilizer 7. These elements will be described below.

Base 2:

The base 2 is typically disposed on the ground 0 or on a suitable support surface near the ground (up to 2 meters from the ground, for example). The base 2 has a floor 2a. A conventional slip and spider (hereinafter referred to simply as spider) 2b as commonly used on oil rigs is provided at the center of the top surface of the floor 2a for rigidly supporting the first steel pipe P1 in a vertical (upright) position. The upper end of the first steel pipe P1 preferably having a box (or a coupling in the case of a coupling-type threaded joint) preferably extends above the upper surface of the spider 2b far enough to provide sufficient space for the first tong 5 to grasp the first steel pipe P1. An example of a suitable distance by which the upper end of the first steel pipe P1 above the spider 2b is 700-1300 mm and for example, approximately 1000 mm. A mechanism other than the spider 2b may instead be used to support the first steel pipe P1.

A hole 8 for receiving the first steel pipe P1 which is supported by the spider 2b is formed beneath the base 2 into the ground 0. The base 2 has an unillustrated through hole aligned with the hole 8. The first steel pipe P1 can pass through the through hole in the base 2 into the hole 8 under the ground 0. The through hole in the base 2 and the hole 8 in the ground both have a diameter which is larger than the largest outer diameter of steel pipes to be tested. The hole 8 has a depth such that the bottom of the first steel pipe P1 does not contact the bottom of the hole 8 when the first steel pipe P1 is held by the spider 2b. Preferably, the depth of the hole 8 is greater than the length of the first steel pipe P1, and it may be greater than twice the length of the first steel pipe P1. It is preferable that at least a half and more preferably at least ¾ of the length of the first steel pipe P1 be positioned in the hole 8 under the ground 0 when testing. In an example, the hole 8 is a well having a diameter of 20 inches and a depth of 30 meters.

In this manner, the base 2 holds the first steel pipe P1 upright in a fixed vertical position with the upper end of the first steel pipe P1 projecting upwards from the top surface of the base 2 and a part and preferably the major part of the remainder of the first steel pipe P1 disposed under the ground 0. The base 2 can be installed in any convenient location, either out of doors or indoors.

Support Member 3:

The support member 3 extends upwards from the floor 2a of the base 2. The support member is secured to the top surface of the floor 2a and is spaced from the first steel pipe P1 which is supported in a fixed position at the center of the top surface of the floor 2a by the spider 2b.

The support member 3 can be any member that gives a support for the first steel pipe P1 or the second steel pipe P2 when it is suspended, and it is not limited to a particular type of structure. For example, it could be a conventional derrick or mast commonly used for drilling oil wells. In the embodiment shown in FIG. 1, the support member 3 comprises two vertical support pillars 3a and 3b firmly secured to the base 2 and a rigid cross bar 3c connecting the upper ends of the support pillars. The number of support pillars may be one (e.g., an arciform wall) or may be three or more. However, in order to reduce equipment costs, there are preferably at most four support pillars, and more preferably there are two support pillars.

The support pillars 3a and 3b both have an unillustrated vertically-extending guide rail which guides the below-described stabilizer 7 for vertical movement. The length of the support pillars 3a and 3b is sufficiently long for the support member 3 to support the second steel pipe P2 above the first steel pipe P1 which is partly disposed under the ground. An example of a suitable length of the support pillars 3a and 3b is around 4-8 meters longer than the length of the second steel pipe P2.

The support member 3 supports the second steel pipe P2 so that its axis is aligned with the axis of the first steel pipe P1. For this purpose, in the illustrated embodiment, the cross bar 3c is disposed to the rear of the support pillars 3a and 3b.

Suspending Mechanism 4:

The suspending mechanism 4 is a mechanism for suspending the second steel pipe P2 from the support member 3 above the first steel pipe P1 during testing. The suspending mechanism 4 is not limited to any particular structure. In this example, the suspending mechanism 4 includes a conventional crane 9 disposed in the vicinity of the support member 3. The crane 9 includes a wire 12 which extends from a winch 9a at the base of the crane 9 over a conventional pulley 3d mounted atop the cross bar 3c and to a conventional hook block 10. The hook block 10 is supported by the crane 9 and is disposed such that it can be raised and lowered between the support pillars 3a and 3b of the support member 3 by being guided along the guide rails (not shown) of the support pillars 3a and 3b.

A conventional elevator 11 of the type commonly used on oil rigs is suspended from the hook block 10 by a wire 11a. The elevator 11 can releasably grip the second steel pipe P2 in a position near its upper end 13b, for example at the border between the coupling and the steel pipe body of the second steel pipe P2 in the case of a coupling-type threaded joint. Since the outer diameter of a coupling is larger than that of a pipe body, there is a step at the border between these members and the elevator can be held using this step. The second steel pipe P2 can be raised and lowered as well as suspended at a desired height by operating the winch 9a of the crane 9.

In the case of an integral threaded joint, a lifting plug having male threads at its tip (lower end) and small holes sufficient for the wire 12 to pass through at its rear end (upper end) may be used in place of the elevator 11. The lifting plug can suspend the second steel pipe P2 by screwing it into the box at the upper end of the second steel pipe P2.

The suspending mechanism 4 can also be used to suspend the first steel pipe P1 from the support member 3 when the first steel pipe P1 is being lowered into the hole 8 beneath the base 2 and is supported by the spider 2b. The elevator 11 of the suspending mechanism 4 can grasp the first steel pipe P1 in the same manner as shown for grasping the second steel pipe P2 in FIG. 1.

First Tong 5, Second Tong 6:

The first tong 5 and the second tong 6 are both mounted on an unillustrated tong mounting frame having a periphery shown by the dashed lines in FIG. 1. The tong mounting frame is suspended, for example, from the crane 9 by unillustrated structure (such as by use of a subsidiary wire) and is disposed in such a manner that it can be raised and lowered so that the first and second steel pipes P1 and P2 are grasped by the tongs 5 and 6 from the lateral side. The shape of the tong mounting frame may not always have a framework. It may be comprised of a single frame to which the first and second tongs 5 and 6 can be connected with a predetermined distance between these tongs.

The first tong 5, which is disposed below the second tong 6, has a plurality of claws which can releasably grasp the first steel pipe P1 so as to prevent it from rotating during make-up and break-out.

The second tong 6 also has a plurality of claws which can releasably grasp the second steel pipe P2. The second tong 6 can rotate the second steel pipe P2 around its axis while grasping it so as to coaxially align with the first steel pipe P1.

The first and second tongs 5 and 6 may be conventional tongs of the type commonly employed on oil rigs. The vertical spacing between the first and second tongs 5 and 6 can be that typically employed with conventional tongs on oil rigs during make-up and break-out of joints.

The pin of the second steel pipe P2 which is lifted by the suspending mechanism 4 is made to approach the box on the uppermost portion of the first steel pipe P1 which is fixed by the first tong 5, and by rotating the second steel pipe P2 around its axis by the second tong 6, connection (make-up) and disconnection (break-out) of the first steel pipe P1 and the second steel pipe P2 can be carried out by the threaded joint of the pipes while a prescribed torque is imparted to the threaded joint.

In a recently proposed test apparatus which is similar to a practical oil rig, a mechanism for gripping the upper end of the second steel pipe P2 to rotate it was disposed high above the ground, and a support member for the second steel pipe needed to be quite large and tall. However, in a test apparatus 1 according to the present invention, the second tong 6 which rotates the second steel pipe P2 is disposed near the top surface of the base 2, so the test apparatus according to the present invention can be simpler in structure than a conventional test apparatus.

In this manner, by grasping the first steel pipe P1 with the first tong 5 so that the first steel pipe P1 is prevented from rotating and grasping the second steel pipe P2 with the second tong 6 so that the second steel pipe P2 can be rotated, make-up and break-out of the first steel pipe P1 and the second steel pipe P2 by the threaded joint can be carried out.

Stabilizer 7:

As stated above, when two oil country tubular goods are connected or disconnected on an oil rig, on account of bending of the long oil country tubular goods, the upper oil country tubular good which is suspended may gyrate, particularly in its upper half. This gyration can produce large variation in the results of testing of joint performance. Accordingly, the test apparatus 1 according to the present invention includes a stabilizer 7 which limits the radius of gyration of the second steel pipe P2 within a predetermined value.

The stabilizer 7 is mounted at a desired position in the height direction of the support member 3 between the support pillars 3a and 3b by the unillustrated guide rails of the support member 3. Vertical movement (raising and lowering) of the stabilizer 7 can be carried out, for example, using the crane 9 and a suspending means (not shown) including a winch and a wire which are separate from those in the suspending mechanism 4. The stabilizer 7 is preferably disposed above the lengthwise center 13a of the second steel pipe P2 because the extent of gyration of the second steel pipe P2 when it is being connected to the first steel pipe P1 is greater in the upper half of the second steel pipe P2.

Figure 2:
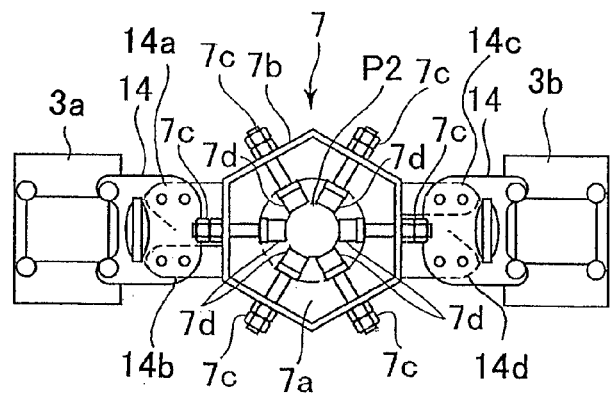
FIGS. 2(a) and 2(b) are top plan views of a stabilizer of a test apparatus for a threaded joint for oil country tubular goods according to the present invention.
Figure 2:
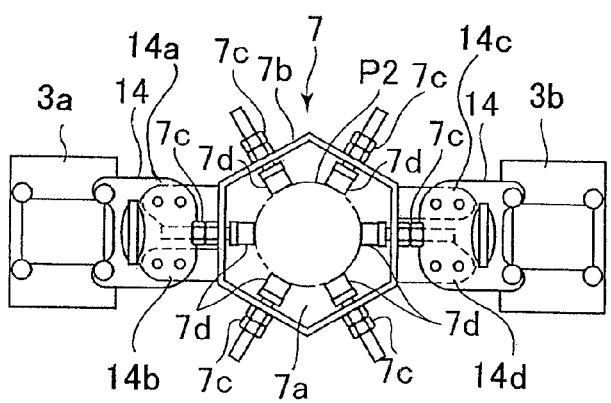

FIGS. 2(a) and 2(b) are top plan views of the stabilizer 7 of the illustrated embodiment of a test apparatus 1. FIG. 2(a) shows the state when the second steel pipe P2 has a small diameter, and FIG. 2(b) shows the state when the second steel pipe has a large diameter.

The stabilizer 7 in the illustrated embodiment comprises a body 7b having a bore 7a extending over its height through which the second steel pipe P2 can pass, and two guide portions 14 extending to the opposite sides of the body 7b. The body 7b is linked to each guide portion 14 at two locations 14a and 14b or 14c and 14d. The guide portions 14 are guided between the support pillars 3a and 3b such that they are raised and lowered. The stabilizer 7 has a structure which allows the body 7b to split (not shown), and by unlinking some of the linkages 14a-14d of the body 7b to the guide portions 14, the stabilizer 7 can be held between the support pillars 3a and 3b with the body 7b in a split and open state. Although the structure is simplified in FIG. 1, the stabilizer 7 in FIG. 1 has a structure as shown in FIGS. 2(a) and 2(b) and as explained above.

As shown by the enlarged view in FIG. 1 and FIGS. 2(a) and 2(b), the stabilizer 7 has a plurality of screws 7c as adjustable protrusions (such as six screws in the illustrated example) threadingly mounted in the body 7b so as to extend radially inwards from the inner wall of the bore 7a. The distance by which the screws 7c extend into the bore 7a can be adjusted by rotating the screws 7c to translate them towards or away from the center of the bore 7a. The screws 7c may be equipped with lock nuts for securing them in desired positions.

A steel ball 7d which acts as a ball bearing is rotatably mounted at the center of the inner end of each screw 7c. Each ball 7d is preferably embedded to at least half of its diameter in the corresponding screw 7c. Even if the balls 7d disposed at the ends of the screws 7c contact the outer surface of the second steel pipe P2 which rotates while being gripped by the second tong 6, the rotatable balls 7d do not obstruct the rotation of the second steel pipe P2. Mechanisms other than the balls 7d which can contact the outer surface of the second steel pipe P2 without obstructing its rotation can instead be employed.

The distance by which the screws 7c extend into the bore 7a is usually adjusted so that the balls 7d at the inner ends of the screw 7c are tangent to an imaginary circle (shown by a dashed line in FIG. 2(b)) which is concentric with the axis of the first steel pipe P1 which is fixed by the first tong 5. The diameter of the imaginary circle is set to be greater than the diameter of the second steel pipe P2 which passes through the bore 7a in the stabilizer 7. The imaginary circle defines the permissible or maximum possible radius of gyration of the second steel pipe P2 at the height of the stabilizer 7, which is equal to ½ of the difference between the diameter of the imaginary circle and the outer diameter of the second steel pipe P2. The diameter of the imaginary circle, and therefore the maximum possible radius of gyration, can be varied by adjusting the distance by which the screws 7c of the stabilizer 7 extend in accordance with the size of the second pipe P2.

When evaluating the joint performance of a threaded joint for oil country tubular goods, by adjusting the radius of gyration of the second steel pipe P2, the load applied to the threaded joint during repeated connecting and disconnecting can be varied, so by adjusting the radius of gyration based on the target performance of the threaded joint, it is possible to properly evaluate whether or not galling takes place under repeated tightening and loosening.

Next, a method of testing the performance of a threaded joint for oil country tubular goods using the illustrated test apparatus will be described by taking an example of a coupling-type threaded joint in which each of the first steel pipe P1 and the second steel pipe P2 has a coupling previously mounted on one end thereof.

The test apparatus 1 is in a situation in which the hook block 10 of the suspending mechanism 4 is suspended by the wire 12 from the crane 9 and the elevator 11 is suspended from the hook block 10 while the tong mounting frame on which the first tong 5 and the second tong 6 are suspended with a subsidiary wire at a predetermined height such that these tongs can grasp the first and second steel pipes from the lateral side. The stabilizer 7 in which the body 7b thereof is in the above-described split and open state is mounted to the support pillars 3a and 3b.

First, the elevators 11 is positioned on the first steel pipe P1 so as to support one end of the first steel pipe P1 below the coupling, and the crane 9 is operated to lift the first steel pipe P1 and then lower it partially into the hole 8 beneath the base 2. When the upper end of the first steel pipe P1 which projects from the base 2 is at a suitable height above the base 2, the spider 2b is employed to secure the first steel pipe P1 in a testing position.

The elevators 11 is then positioned on the second steel pipe P2 in the same manner as described for the first steel pipe P1, and the crane 9 is operated to lift the second steel pipe P2 and keep it in an upright position in the vicinity of the first steep pipe P1.

The body 7b of the stabilizer 7 in its open state is then closed so as to surround the second steel pipe 2 and the stabilizer 7 is vertically moved to a predetermined height. The screws 7c of the stabilizer 7 have previously been adjusted to give a predetermined possible maximum radius of gyration of the second steel pipe P2. The possible maximum radium of gyration may be fine-tuned after closing of the stabilizer 7. Thereafter, the upper end of the first steel pipe P1 is grasped by the first tong 5 so as to prevent the pipe from rotating, and the lower end of the second steel pipe P2 is grasped by the second tong 6 in such a manner that this pipe can be rotated about its axis.

The second steel pipe P2 is then rotated about its axis by the second tong 6 with a predetermined torque while the first tong 5 maintains the first steel pipe P1 stationary so that the threads of the pin and the box are tightened and then loosened to perform make-up and break-out of the threaded joint. Make-up and break-out of the threaded joint can be repeated for a predetermined number of times, and the joint performance such as the occurrence of galling is observed on the pin and/or box after each time of break-out.

With a test apparatus 1 according to the present invention, make-up and break-out of a threaded joint of the first steel pipe P1 and the second steel pipe P2 are carried out by the first tong 5 and the second tong 6 which are disposed relatively close to the base 2, and a suspending portion for the second steel pipe P2 is constituted by a usual crane 9 and support pillars 3a and 3b. Therefore, it is not necessary to rotate the second steel pipe at a high position corresponding to the upper end of the first steel pipe P1 placed upright on the ground in a conventional manner, and the joint performance of a threaded joint for oil country tubular goods can be accurately evaluated with relatively simple equipment.

The base 2 where a tester stands while checking the condition of the joint after a test is disposed on or close to the ground. Therefore, the tester can perform his job rapidly and safely.

In this manner, according to the present invention, the performance (such as the galling resistance) of a threaded joint for an actual oil country tubular good can be accurately, easily, and inexpensively evaluated.

In the illustrated embodiment, since the stabilizer has a mechanism for adjusting the possible maximum radius of gyration of the suspended second steel pipe P2, it is possible to accurately, easily, and inexpensively evaluate the joint performance of a plurality of types of oil country tubular goods having different dimensions and target performance.

When using a test apparatus according to the present invention, by heating or cooling the first and second steel pipes P1 and P2 before make-up, it is possible to perform testing corresponding to the temperatures of various locations around the world where oil country tubular goods are installed. In order to perform cooling, a cooling medium such as dry ice can be packed into a donut-shaped cooling tank surrounding the joint. In order to perform heating, a plurality of electric heater formed in an arc shape can be disposed on the outer periphery of a joint. In this manner, it is possible to carry out testing at a temperature ranging from −40° C. or below to higher than 100° C.

Second Embodiment

Next, a second embodiment of a test apparatus 1-1 according to the present invention will be described while referring to FIG. 3. In the following description, only portions which are different from the above-described first embodiment will be explained, and portions which are the same as in that embodiment are affixed with the same reference numbers, so a repeated explanation thereof will be omitted.

Figure 3:
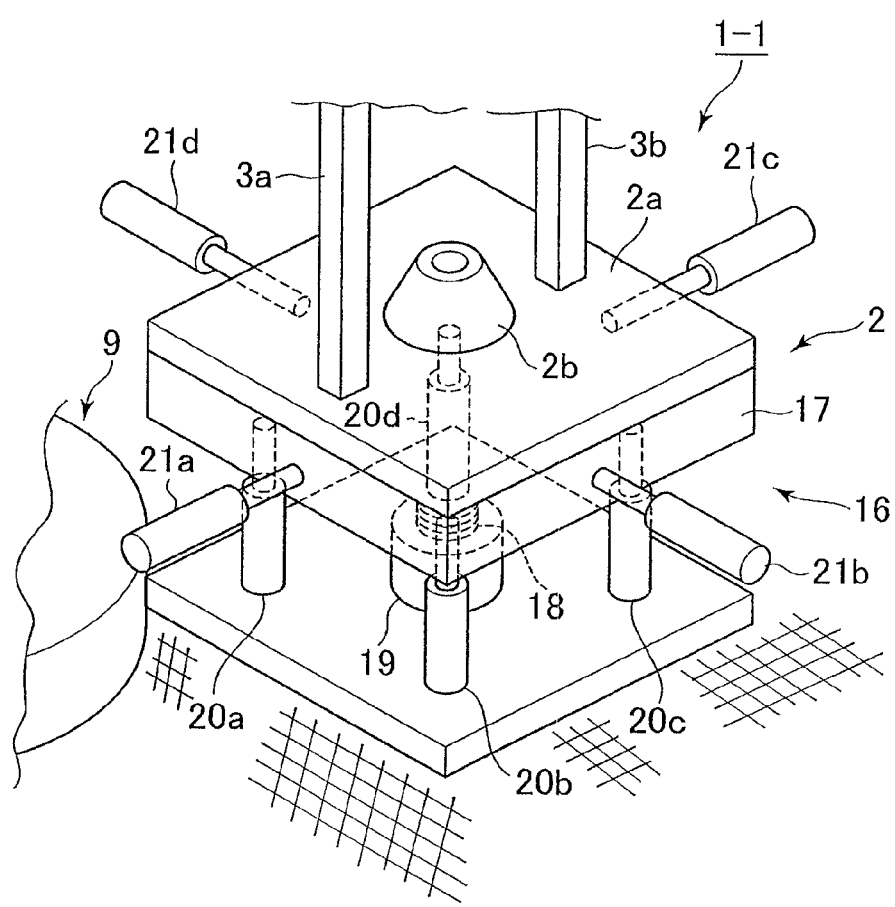
FIG. 3 is an explanatory view showing a mechanism for oscillating the base vertically and/or horizontally in a test apparatus for a threaded joint for oil country tubular goods according to the present invention.

As shown in FIG. 3, the base 2 of this embodiment of a test apparatus 1-1 includes an oscillating mechanism 16 for producing vertical and/or horizontal oscillation of the floor 2a of the base 2.

The vertically and/or horizontally oscillating mechanism 16 of the base 2 includes an oscillating base 17 on which the floor 2a is mounted. A helical spring 18 is disposed at the center of the bottom surface of the oscillating base 17 and has a bore through which the first steel pipe P1 passes. The spring 18 is supported atop a hollow spring base 19 which has a bore through which the first steel pipe P1 passes. Four hydraulic cylinders 20a-20d for producing vertical oscillations are disposed at four locations on the bottom surface of the oscillating base 17. In addition, four hydraulic cylinders 21a-21d for producing horizontal oscillations are disposed at four locations on the side surface of the oscillating base 17.

Except for the structure shown in FIG. 3, this embodiment of a test apparatus 1-1 has the same structure as the first embodiment of a test apparatus 1.

The oscillating base 17 can produce vertical and horizontal oscillations like the oscillations experienced on an offshore oil rig by suitably operating the vertical oscillation hydraulic cylinders 20a-20d and the horizontal oscillation hydraulic cylinders 21a-21d. As a result, the floor 2a of the base 2 undergoes the same type of vertical oscillation and horizontal oscillation as on an offshore oil rig. Therefore, a test of joint performance which simulates the conditions on an offshore oil rig can be performed on land.

In this manner, according to this test apparatus 1-1, in addition to the effect of the test apparatus 1 of the first embodiment, the performance of a threaded joint for oil country tubular goods in an environment which undergoes oscillation such as on an offshore oil rig can be accurately evaluated.

Example 1

Threaded joints for oil country tubular goods were tested using the test apparatus 1 according to the present invention shown in FIG. 1 and a conventional test apparatus in which short steel pipes having a length of 1 to 1.5 meters are used for testing. The steel pipes which constituted a coupling-type threaded joint to be tested in the test apparatus 1 were steel pipes made of a high alloy and having an outer diameter of 244.48 mm, a wall thickness of 13.84 mm, and an overall length of approximately 11 meters including the coupling secured to the steel pipe on one end. The threaded joint was a premium threaded joint having a thread shape which is not specified by API and which includes a metal sealing portion. The steel pipes which constituted a coupling-type threaded joint to be tested in the conventional test apparatus were the same steel pipes as described above except that their overall length was 1 meter including the coupling.

The performance of these threaded joints was evaluated by carrying out repeated make-up and break-out after lubrication with the same solid lubricant.

In the test using the test apparatus 1 according to the present invention, the stabilizer was located at a height which was 1500 mm below the border between the coupling and the steel pipe body of the second steel pipe. The border was supported by the elevator. The screws projecting from the bore of the stabilizer were adjusted so that the maximum possible radius of gyration was 2.5 inches (50.80 mm).

When a threaded joint constituted by short steel pipes was tested in the conventional test apparatus by repeating make-up and break-out for 5 cycles, the occurrence of galling was not observed at all.

In contrast, when a threaded joint constituted by the full-length steel pipes having the same thread shape as the short steel pipes were tested using a test apparatus according to the present invention shown in FIG. 1 under the same conditions in the conventional test apparatus, galling which made break-out impossible occurred due to damage to the threads of the threaded joint after two cycles of make-up and break-out, and test could not be performed any more.

These results illustrate that with a conventional test apparatus using short steel pipes, it is not always possible to accurately predict the joint performance of a threaded joint for oil country tubular goods. Because a test apparatus according to the present invention performs testing of a threaded joint with actual oil country tubular goods, it can more accurately predict the performance of a threaded joint under operating conditions experienced on an oil rig.

Example 2

The joint performance of four identical threaded joints was tested using full-length steel pipes and using the test apparatus 1 according to the present invention shown in FIG. 1 and a comparable test apparatus which was the same as the test apparatus 1 except that the stabilizer 7 was omitted. The steel pipes constituting a threaded joint tested in this example were the same as the full-length steel pipes for oil country tubular goods used in Example 1 having an outer diameter of 244.48 mm, a wall thickness of 13.84 mm, and an overall length of approximately 11 meters, and therefore the threaded joint is a coupling-type premium joint made of a high alloy steel.

In the test apparatus 1 according to the present invention, the maximum possible radius of gyration of the stabilizer 7 was set at 2.5 inches (50.80 mm), so the screws 7c of the stabilizer 7 were adjusted such that the inner ends of the screw 7c (balls 7d) were tangent to an imaginary circle having a diameter of 346.08 mm The position at which the stabilizer 7 is mounted was the same as in Example 1.

As shown in Table 1, the box which was the inner surface of the coupling mounted on upper end of the first steel pipe in each joint was subjected to surface treatment to form a coating of manganese phosphate, while the pin which was the outer surface in the lower end portion of the second steel pipe was not subjected to surface treatment. Prior to the test, a dope (greasy lubricant) conforming with API standards (indicated in Table 1 as "API dope") was applied to the pin and the box of each joint. As in Example 1, make-up and break-out were repeated for up to 5 cycles for each joint, and the number of cycles which were performed until the occurrence of galling was recorded.

TABLE 1

| | Surface treatment | | Lubricant | | | No. of successful |
|---|---|---|---|---|---|---|
| No. | 1st steel pipe (box) | 2nd steel pipe (pin) | 1st steel pipe (box) | 2nd steel pipe (pin) | Stabilizer used | make-ups and break-outs |
| 1 | manganese phosphate | — | API dope | API dope | no | 1 |
| 2 | manganese phosphate | — | API dope | API dope | no | 4 |
| 3 | manganese phosphate | — | API dope | API dope | yes | 5 |
| 4 | manganese phosphate | — | API dope | API dope | yes | 5 |

As can be seen from Table 1, joints Nos. 1 and 2 which were tested using a test apparatus not equipped with a stabilizer 7 had a large variation in results, even though the two joints were identical and were tested under the same conditions. In contrast, joints Nos. 3 and 4 which were tested using a test apparatus equipped with a stabilizer 7 had the same test results. These results illustrate the ability of a stabilizer 7 to stabilize the test results and increase the reproducibility of the results.

Example 3

The results of joint performance of different types of threaded joints tested using the test apparatus shown in FIG. 1 are summarized in Table 2. Joints Nos. 5 and 6 were double joints in which the second steel pipe was constituted by two full-length steel pipes (with an overall length of about 11 meters) connected in series. Joints Nos. 7 and 8 were integral joints constituted by oil country tubular goods having a pin on one end and a box on the other end. In the case of a double joint, the elevator and the stabilizer were mounted at the same position as mentioned in Example 1 of the upper steel pipe among the two full-length steel pipes connected in series.

As shown in Table 2, the double joints were surface-treated in the same manner as in Example 2. For each of the integral joints, the box was surface-treated by zinc phosphating, and the pin was surface-treated by sand blasting and then by zinc phosphating. The same API dope as used in Example 2 was applied to the surfaces of the pin and box of each joint prior to the test.

TABLE 2

| | Surface treatment | | Lubricant | | | No. of successful | |
|---|---|---|---|---|---|---|---|
| No. | 1st steel pipe (box) | 2nd steel pipe (pin) | 1st steel pipe (box) | 2nd steel pipe (pin) | Stabilizer used | make-ups and break-outs | Joint type |
| 5 | manganese phosphate | — | API dope | API dope | yes | 5 | Double joint |
| 6 | manganese phosphate | — | API dope | API dope | yes | 5 | Double joint |
| 7 | zinc phosphate | sand blasting → zinc phosphate | API dope | API dope | yes | 5 | Integral joint |
| 8 | zinc phosphate | sand blasting → zinc phosphate | API dope | API dope | yes | 5 | Integral joint |

As can be seen from Table 2, the use of a test apparatus according to the present invention makes it possible to stabilize the test results and increase reproducibility for different types of threaded joints for oil country tubular goods.

EXPLANATION OF SYMBOLS

0: ground surface; 1, 1-1: test apparatus according to the present invention; 2: base; 2a: floor; 2b: spider; 3: support member; 3a, 3b: support pillars; 3c: cross plate; 4: suspending mechanism; 5: first tong; 6: second tong; 7: stabilizer; 7a: bore; 7b: body; 7c: thread; 7d: ball; 8: hole; 9: crane; 10: hook block; 11: elevator; 12: wire; 13a: center; 13b: end portion; 14: guide portion; 16: oscillating mechanism; 17: oscillating base; 18: spring; 19: spring base; 20a-20d: hydraulic cylinders for vertical oscillation; 21a-21d: hydraulic cylinders for horizontal oscillation; P1: first steel pipe; P2: second steel pipe

The invention claimed is:

1. A test apparatus for testing a threaded joint for oil country tubular goods using a first and a second steel pipe for use as oil country tubular goods comprising:
   a base which holds a first steel pipe in an upright position with an upper end of the first steel pipe projecting above an upper surface of the base and the remainder of the first steel pipe disposed through the base and partly under the ground;
   a support member which extends upwards from the base and is spaced from the first steel pipe;
   a suspending mechanism which suspends a second steel pipe above the first steel pipe;
   a first tong which grasps the first steel pipe;
   a second tong which grasps the second steel pipe and rotates the second steel pipe around its axis to carry out make-up and break-out of the first and second steel pipes by means of the threaded joint to be tested; and
   a stabilizer which is mounted on the support member such that its height can be raised or lowered and which restricts the radius of gyration of the second steel pipe at the height of the stabilizer within a predetermined value.

2. A test apparatus as set forth in claim 1 wherein the stabilizer has a bore through which the second steel pipes can pass and the bore constitutes a means for restricting the radius of gyration of the second steel pipe.

3. A test apparatus as set forth in claim 1 wherein the stabilizer is disposed above a lengthwise center of the second steel pipe which is suspended by the suspending mechanism.

4. A test apparatus as set forth in claim 1 wherein the stabilizer has a mechanism for adjusting a permissible radius of gyration of the second steel pipe.

5. A test apparatus as set forth in claim 4 where the mechanism for adjusting the permissible radius of gyration of the second steel pipe is constituted by a plurality of adjustable protrusions provided on the wall of the bore of the stabilizer.

6. A test apparatus as set forth in claim 1 wherein the support member comprises a plurality of support pillars disposed such that the first steel pipe is located between them.

7. A test apparatus as set forth in claim 1 wherein the suspending mechanism comprises a crane having a wire and a hook block for suspending the second steel pipe.

8. A test apparatus as set forth in claim 1 wherein the base has a mechanism for producing vertical and/or horizontal oscillation of the base.

* * * * *